2,749,796

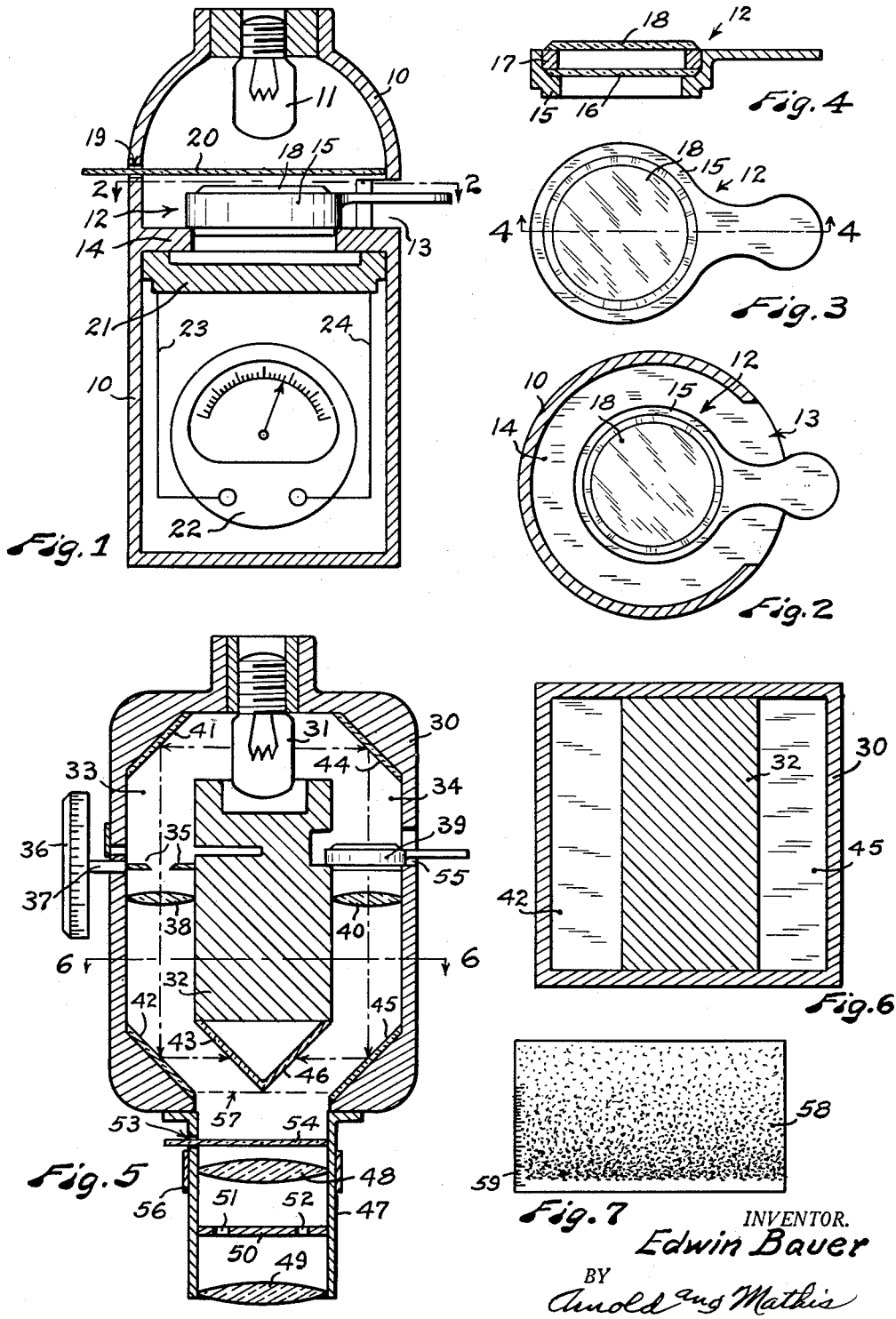

PROCESS OF DETERMINING DEGREE OF MILLING OF FLOUR AND APPARATUS FOR SAME

Edwin Bauer, Berlin, Germany

Application April 19, 1951, Serial No. 221,828

6 Claims. (Cl. 88—14)

My invention relates to the process for determining the degree of milling of flour and to the apparatus for carrying out said process.

More particularly, my invention relates to determining the degree to which flour has been milled by an optical or photo-sensitive electrical means and the preparation of the flour for the use of such process.

For purposes of illustration and definiteness of description I will set forth my patent as relates to the milling of wheat flour, but it will be understood that the same applies to flour-involving problems similar to those of wheat.

In the baking of articles of wheat flour it is highly important to determine the degree to which said flour has been milled. The milling of flour has for its purpose the separation of the bran from other portions of the wheat kernel.

The degree of milling of the flour employed in preparing food is of decisive importance for the quality of that food. As an example, bakers of bread have long noted the importance of the degree of milling as affecting the quality of the bread. Flour of "high milling" is inferior to flour of "low milling." "Low milling" designates flour with a comparatively low content of bran. The term "bran" does not only indicate the outer skins of the kernel or seed, but also other cells and fibrous material of the wheat kernel including the under layer of aleurone coating and the germ of the grain.

The present technique of testing the degree of milling, so far as I know, does not afford assurance of the desirable complete division of endosperm and bran. Neither the experienced miller nor the analyst is able to determine exactly the amount of bran in the flour. According to practice to date, there is, in fact, only an approximate evaluation possible by the analytic process. This proceeds along the line of analyzing the contents of ashes, raw fibers, fat, raw protein and starch of a sample of flour. The comparison of these different analyses of the flour and of the original grain permits the drawing of conclusions about the contents of bran in the flour. Manifestly, this constitutes a tedious, time-consuming, and complex procedure. It is highly important and desirable to have a simple process and apparatus for expeditiously evaluating the contents of bran in the flour as a whole.

A primary object of my invention is the providing of such a process or method and apparatus.

One of the great difficulties encountered in analyzing flour for its bran content resides in the fact that the physical and chemical properties of the different grain components differ widely. Such components as epidermis, epicarp, endocarp testa, episperm aleurone cells, germ (with all its component parts) being referred to and covered herein by the term bran as opposed to the endosperm component which represents the finished and purified product remaining after the milling process. However, it is to be noted that some types of flours are in use employing parts of the bran along with the endosperm.

The problem is further complicated by the fact that the physical and chemical properties differ not only as above set forth, but also as between different brands of wheat, and also as between wheat grown in different areas.

Another difficulty, mostly affecting the physical properties, results from artifical bleaching (when employed) of the bran.

Accuracy in determining the degree of milling requires that the process should involve a determination of the total amount of bran without consideration of the chemical composition of its components.

In the present invention, I have achieved the providing of such a process and apparatus for carrying out such process.

In general and briefly stated, my invention or discovery comprises the fact that the absorption of light upon passing of the light through a suitably prepared sample of the flour is proportional to the amount of bran present in the sample at any given stage of milling. The preparation includes the staining and thereby forming a paste of a sample of flour with a chemical of my discovery which affects substantially all the component parts of the bran but not the endosperm. Such chemical stains or dyes I have found comprise certain aniline acid salts, specifically aniline sulphate and aniline hydrochloride. When such stains or dyes are used in a proportion exceeding .5% of the flour by weight, the sample very shortly darkens and gives uncertain results in light absorption. I have discovered that it is possible to calibrate flour accurately when the flour is wet stained and made into paste thereby breaking up the flour particles into a colloidal suspension because this provides for metering equal quantities of flour by weight when equal volumes are taken.

The above general objects of my invention, together with others inherent in the same, are attained by the device illustrated in the following drawings, throughout which drawings like reference numerals indicate like parts:

Figure 1 is a view in vertical section of a photo-electrical apparatus with a calibrator in place embodying my invention;

Fig. 2 is a view in cross-section on dotted line 2—2 of Fig. 1;

Fig. 3 is a view in plan of the calibrator member;

Fig. 4 is a view in cross-section of the calibrator on dotted line 4—4 of Fig. 3;

Fig. 5 is a view in vertical section with the calibrator in place for use in employing the optical method;

Fig. 6 is a view in cross-section on dotted line 6—6 of Fig. 5; and

Fig. 7 is a plan view of a modified form of light attenuator or dimmer.

The photo-electric apparatus shown in Fig. 1 consists of a housing 10 in the upper part of which an incandescent bulb 11 is mounted. Below the incandescent bulb 11 is located the calibrator 12 (a grain flour paste sample holder) insertable into the path of the light from said bulb through an opening 13. This calibrator is supported on a flange 14. The frame 15 of the calibrator 12 supports a glass bottom 16 held in place by a metal ring 17, the upper face of which is very finely ground so that a cover glass 18 may fit tightly thereon by capillary adhesion when provided with a film of moisture.

An opening 19 in the housing 10 permits the insertion of a blue filter 20.

Beneath this flange 14 is the photo-electric cell 21. The cell is connected to a direct current milliampere-meter 22 by the leads 23 and 24. The amount of light passing through the sample affects a smaller or larger deflection of the pointer in the ammeter 22, proportional to the amount of light having passed through the sample. This meter 22 is directly calibrated to indicate the percentage of bran present in the sample of flour contained in the calibrator or grain flour paste sample holder 12.

Another form of the device is shown in Fig. 5 wherein a housing 30 has a source of light as an incandescent bulb 31. An axially located partition 32 forms channels 33 and 34. In light channel 33 (schematically shown) is a light attenuator or dimmer 35. This dimmer may take the form of an iris diaphragm, which is controlled by a calibrated dial 36 mounted on shaft 37. Beneath the dimmer 35 is preferably located a lens 38.

In light channel 34 is located grain flour paste sample holder 39, constructed like holder 12 and insertable through opening 55. Beneath said holder 39 may be located lens 40.

Light deflectors 41 and 42 are located in channel 33, deflector 42 having an oppositely disposed deflector 43.

In channel 34 are located light deflectors 44 and 45, deflector 45 having oppositely disposed deflector 46.

To the housing 30 is preferably secured a cylindrical housing 47 having therein lens 48 and 49. Also, between said lens 48 and 49 is preferably located a diaphragm 50 having two openings 51 and 52. A slot 53 in housing 47 permits the insertion of a blue filter 54. A slidable collar 56 may close the slot 53 when the filter is not used.

*Mode of operation*

Referring to Fig. 1, light from bulb 11 passes through a prepared sample of flour disposed in the calibrator or holder 12. This flour is treated with aniline acid stain or dye. I have discovered that equal parts by weight of flour and an aqueous stain containing not more than 0.5% of aniline sulphate or aniline hydrochloride may be used to form a paste. This is supplied to the holder 12 in an excess amount. Thereupon the cover glass 18 is slid across the ring 17 thereby brushing off any excess. A capillary adhesion results between the peripheral portions of the glass cover 18 and the ring 17. In this way uniform quantities of the material in suspension constitute the samples. The holder or calibrator 12 is then inserted through the opening 13 and then set in the flange 14.

Light, therefore, from a bulb 11 may pass through the sample and thence to the photo cell 21. Thus a current is set up through the leads 23 and 24 to the milliammeter 22 providing a direct reading of the amount of light that is received through the sample. I have discovered that the amount of absorption of light in such a sample is proportional to the amount of bran in the sample. It will be understood that the milliammeter 22 has been calibrated to indicate the amount of bran directly according to the amount of light which is absorbed by the bran in the sample.

I have discovered that the employment of the blue filter 20 inserted through the slot 19 functions as follows: The proportionality between the light absorption in the sample and the contents of bran present in the sample is rendered nearly directly proportional so that by employing the blue filter the scale divisions on the meter can be made practically equal and thus facilitate the reading. Thus is provided an expeditious means for determining the degree of milling, that is, the degree of bran separation.

Referring to the modified form shown in Fig. 5, the mode of operation is as follows: The sample provided in the holder 39 is prepared as explained above. This is inserted in position through an opening 55 in the housing 30.

Light from a source, such as bulb 31, is deflected into channels 33 and 34 by means of deflecting means 41 and 44 respectively. The light passing through channel 34 then passes through the sample in the holder 39 and preferably through lens 40 and is deflected by deflecting means 45 to deflecting means 46. Thence the light passes into the optic system in housing 47 which has been constructed in such a manner that this light coming through channel 34 illuminates only one half of the visual field. Tracing the light through channel 33, it passes through the attenuator or dimmer means 35, and thence preferably through lens 38 to deflecting means 42 from which it is deflected to deflecting means 43. Thence the light passes into the optic system in housing 47 illuminating the other half of the visual field. The visual field thus consists of two parts of different illumination. By varying the attenuator 35 by revolving the dial 36 the brilliance of illumination of the two halves is matched or made equal. Then the degree of dimming to match is read on the scale on the dial. This dial it will be understood has been calibrated to indicate the amount of light absorption by the bran in the sample in the holder 39. Accordingly, the readings on the dial indicate the proportion of light which has been absorbed by the bran in said sample, and consequently the amount of bran therein.

This field is viewed through lens 49 and through the openings 51 and 52 of diaphragm 50 and through the lens 48, thus giving one optic means or system focusing on the plane 57 which is common to both bushels of light, that is, light coming through channels 33 and 34.

Likewise, preferably a blue filter 54 is inserted in slot 53 for the same reasons as indicated above, that is, the blue filter functions to render the divisions on the dial 36 equidistant.

Instead of the dimmer means 35 a slide 58 as shown in Fig. 7 may be provided. This slide 58 is covered with dark matter in such a fashion that its light absorption is zero at one end and 100% at the opposite end of the slide increasing gradually over the whole length of the slide. The position of the slide necessary to equalize the illumination of the two halves of the visual field as described above is then a measure for the absorption of light by the sample of flour in holder 39 and channel 34 and is read on a scale 59 carried by the slide. This scale it is understood is directly calibrated in percentage of bran contained in the sample of flour in holder 39. In this instance likewise the employment of the blue filter functions as described above in equalizing the divisions of the scale 59.

Obviously, changes may be made in the forms, dimensions and arrangement of the parts of my invention, without departing from the principle thereof, the above setting forth only a preferred form of embodiment.

I claim:

1. The process of determining the degree of milling of grain flour comprising treating the sample of grain flour with a stain of an aqueous solution of an aniline acid salt in causing the stain to affect substantially only all the complex components herein called bran, and changing the physical properties of the flour in forming a paste thereof; forming a calibrated layer of said stained sample of standardized light-passing thickness and uniform mass per unit volume; determining the amount of light absorption of the said sample while in said wet paste condition; and correlating said light absorption with the amount of bran present in the sample.

2. The process of determining the degree of milling of grain flour comprising treating a sample of grain flour with a stain of an aqueous solution of aniline sulphate in forming a paste thereof; forming a calibrated layer of said stained sample of light passing thickness; determining the amount of light absorption; and correlating said light absorption with the amount of bran present in the sample.

3. The process of determining the degree of milling of grain flour comprising treating the sample of grain flour with a stain of an aqueous solution of aniline hydrochloride in causing the stain to affect substantially only all the complex components herein called bran, and changing the physical properties of the flour in forming a paste thereof; forming a calibrated layer of said stained sample of standardized light-passing thickness and uniform mass per unit volume; determining the amount of light absorption of the said sample while in said wet paste condition; and correlating said light absorption with the amount of bran present in the sample.

4. The process of determining the degree of milling of grain flour comprising treating a sample of grain flour with a stain of an aqueous solution of not more than 0.5% of an aniline sulphate in forming a paste thereof; forming a calibrated layer of said stained sample of light passing thickness; determining the amount of light absorption; and correlating said light absorption with the amount of bran present in the sample.

5. The process of determining the degree of milling of grain flour comprising treating the sample of grain flour with a stain of an aqueous solution of not more than 0.5% of aniline hydrochloride in causing the stain to affect substantially only all the complex components herein called bran, and changing the physical properties of the flour in forming a paste thereof; forming a calibrated layer of said stained sample of standardized light-passing thickness and uniform mass per unit volume; determining the amount of light absorption of the said sample while in said wet paste condition; and correlating said light absorption with the amount of bran present in the sample.

6. The process of determining the degree of milling of grain flour comprising treating the sample of grain flour with a stain of an aqueous solution of aniline acid salt in the form of a paste thereof, said aniline salt being selected from the group consisting of aniline sulphate and aniline hydrochloride; forming a calibrated layer of said stained sample of light passing thickness; determining the amount of light absorption; and correlating said light absorption with the amount of bran present in the sample.

References Cited in the file of this patent

UNITED STATES PATENTS

| | | |
|---|---|---|
| 2,045,124 | Cummins et al. | June 23, 1936 |
| 2,058,178 | Reichmann | Oct. 20, 1936 |
| 2,157,438 | Sparks | May 9, 1939 |
| 2,253,049 | Riche | Aug. 19, 1941 |
| 2,255,034 | Bauer | Sept. 2, 1941 |
| 2,525,789 | Frankenfeld | Oct. 17, 1950 |